United States Patent
Ebata et al.

(10) Patent No.: US 10,083,371 B2
(45) Date of Patent: Sep. 25, 2018

(54) AUTHENTICITY DETERMINATION SYSTEM, FEATURE POINT REGISTRATION APPARATUS AND METHOD OF CONTROLLING OPERATION OF SAME, AND MATCHING DETERMINATION APPARATUS AND METHOD OF CONTROLLING OPERATION OF SAME

(71) Applicant: FUJIFILM Corporation, Tokyo (JP)

(72) Inventors: Tetsurou Ebata, Tokyo (JP); Makoto Yonaha, Tokyo (JP)

(73) Assignee: FUJIFILM CORPORATION, Tokyo (JP)

( * ) Notice: Subject to any disclaimer, the term of this patent is extended or adjusted under 35 U.S.C. 154(b) by 425 days.

(21) Appl. No.: 14/857,496

(22) Filed: Sep. 17, 2015

(65) Prior Publication Data

US 2016/0004934 A1 Jan. 7, 2016

Related U.S. Application Data

(63) Continuation of application No. PCT/JP2014/054491, filed on Feb. 25, 2014.

(30) Foreign Application Priority Data

Mar. 26, 2013 (JP) .................................. 2013-063274

(51) Int. Cl.
*A01M 21/04* (2006.01)
*G06T 7/00* (2017.01)
(Continued)

(52) U.S. Cl.
CPC ............ *G06K 9/6215* (2013.01); *G06K 9/00* (2013.01); *G06K 9/00577* (2013.01); *G06K 9/52* (2013.01);
(Continued)

(58) Field of Classification Search
CPC .... G06K 9/6215; G06K 9/00; G06K 9/00577; G06K 9/52; G06Q 30/018; G06T 7/001
See application file for complete search history.

(56) References Cited

U.S. PATENT DOCUMENTS 6,539,106 B1 * 3/2003 Gallarda .............. G01R 31/307
382/149
6,627,888 B2 * 9/2003 Yamaguchi ............ G01N 23/04
250/307
(Continued)

FOREIGN PATENT DOCUMENTS

JP H 04-324583 A 11/1992
JP H 09-44676 A 2/1997
(Continued)

OTHER PUBLICATIONS

International Search Report (ISR) (PCT Form PCT/ISA/210), in PCT/JP2014/054491, dated Apr. 28, 2014.
(Continued)

*Primary Examiner* — David F Dunphy
(74) *Attorney, Agent, or Firm* — McGinn I.P. Law Group, PLLC.

(57) ABSTRACT

A feature point is a point at which a correlation value is greater than a threshold value, wherein the correlation value is calculated between a template and partial image within an area that is one portion of each genuine tablet image. With regard to a cross-check image, which represents a tablet the authenticity of which is to be verified, a correlation value is calculated between a partial image within an area that is one portion of the cross-check image and the template image, and multiple feature points of the cross-check image at which the calculated correlation value is greater than a predetermined threshold value are extracted. The degree of similarity between the cross-check image and the genuine tablet image is calculated using a geometric characteristic of (Continued)

the extracted multiple feature points and a geometric characteristic of the stored multiple feature points of the genuine tablet image.

19 Claims, 16 Drawing Sheets

(51) Int. Cl.
| | | |
|---|---|---|
| *G06K 9/52* | (2006.01) | |
| *B05B 12/12* | (2006.01) | |
| *G06K 9/00* | (2006.01) | |
| *G06T 1/20* | (2006.01) | |
| *G06K 9/62* | (2006.01) | |
| *G06Q 30/00* | (2012.01) | |

(52) U.S. Cl.
CPC ........... *G06Q 30/018* (2013.01); *G06T 7/001* (2013.01); *G06T 2207/30128* (2013.01)

(56) References Cited

U.S. PATENT DOCUMENTS

| | | | | | |
|---|---|---|---|---|---|
| 7,162,073 | B1* | 1/2007 | Akgul | ................ | G01N 21/8851 348/125 |
| 7,936,947 | B1* | 5/2011 | Rueckert | .............. | G06K 9/6212 358/3.26 |
| 2002/0161467 | A1* | 10/2002 | Hashiguchi | ........ | G05B 23/0229 700/116 |
| 2005/0147325 | A1* | 7/2005 | Chen | .................... | G06K 9/6212 382/294 |
| 2007/0165936 | A1* | 7/2007 | Yonezawa | .......... | G06K 9/00899 382/136 |
| 2009/0010489 | A1* | 1/2009 | Appel | ................... | G06T 7/0004 382/100 |
| 2011/0110597 | A1* | 5/2011 | Abe | ..................... | G06K 9/6203 382/199 |
| 2012/0155734 | A1* | 6/2012 | Barratt | .................... | G06T 7/344 382/131 |
| 2013/0101157 | A1* | 4/2013 | Li | ...................... | G06K 9/00805 382/103 |
| 2013/0266230 | A1* | 10/2013 | Peters | ................... | G06T 7/0046 382/224 |
| 2013/0278748 | A1* | 10/2013 | Nakayama | ......... | G06K 9/00536 348/87 |
| 2014/0247977 | A1* | 9/2014 | Han | ........................ | G06K 9/34 382/159 |
| 2015/0199583 | A1* | 7/2015 | Nagatomo | ............. | G06T 7/001 382/145 |

FOREIGN PATENT DOCUMENTS

| | | |
|---|---|---|
| JP | H 09-178442 A | 7/1997 |
| JP | 2005-038389 A | 2/2005 |
| JP | 2005-258940 A | 9/2005 |
| JP | 2006-059282 A | 3/2006 |
| JP | 2009-069019 A | 4/2009 |
| JP | 2009-216342 A | 9/2009 |
| JP | 2012-133484 A | 7/2012 |
| WO | WO 2012/121166 A1 | 9/2012 |

OTHER PUBLICATIONS

Written Opinion (PCT/ISA/237) in PCT/JP2014/054491 dated Apr. 28, 2014, with verified English translation.

Japanese Notification of Reasons for Refusal dated Jun. 28, 2016 with an English translation thereof.

* cited by examiner

AUTHENTICITY DETERMINATION SYSTEM, FEATURE POINT REGISTRATION APPARATUS AND METHOD OF CONTROLLING OPERATION OF SAME, AND MATCHING DETERMINATION APPARATUS AND METHOD OF CONTROLLING OPERATION OF SAME

CROSS-REFERENCE TO RELATED APPLICATIONS

This application is a Continuation of PCT International Application No. PCT JP2014/054491 filed on Feb. 25, 2014, which claims priority under 35 U.S.C. § 119(a) to Japanese Patent Application No. 2013-063274 filed Mar. 26, 2013. Each of the above application(s) is hereby expressly incorporated by reference, in its entirety, into the present application.

BACKGROUND OF THE INVENTION

Field of the Invention

This invention relates to an authenticity determination system, a feature point registration apparatus and method of controlling the operation thereof, as well as a matching determination apparatus and method of controlling the operation thereof.

Description of the Related Art

In recent years the market for counterfeit drugs, especially counterfeit drugs of the tablet type, has grown rapidly worldwide and is a major social problem. In order to discover a counterfeit tablet, methods currently employed include a method of impregnating the surface of a genuine tablet with a special chemical and then detecting this special chemical to thereby distinguish between a genuine tablet and a counterfeit tablet, and a method of printing a hologram on the package that contains the genuine tablets. In addition, there is also a method irradiating a tablet with laser light and identifying whether a tablet is a genuine tablet or a counterfeit table using the spectrum pattern of the reflected light.

Pattern matching using images is known in the art (Patent Documents 1, 2). By utilizing pattern matching, a genuine tablet image identical with a target tablet image under examination is searched from among a number genuine tablet images registered in advance, whereby it can be determined whether the target tablet is genuine or not. Patent Document 3 describes a method of extracting feature points and feature quantities from an image file and from a searched image, and retrieving an image file having a feature quantity that matches or resembles the feature quantity of the searched image. Patent Document 4 describes a method of calculating correlation values between a reference image and a cross-check image and determining the authenticity of a paper document represented by the cross-check image.

Patent Document 1: Japanese Patent Application Laid-Open No. 2005-258940

Patent Document 2: Japanese Patent Application Laid-Open No. 9-178442

Patent Document 3: Japanese Patent Application Laid-Open No. 2012-133484

Patent Document 4: Japanese Patent Application Laid-Open No. 2005-38389

In a case where there are a large number of genuine tablet images, however, subjecting all of these genuine tablet images to processing one by one and calculating correlation values between the genuine tablet images and a target tablet image under examination results in a great amount of calculation and obtaining the final result of the determination takes a very long time.

SUMMARY OF TEE INVENTION

An object of the present invention is to achieve a high-speed determination of authenticity.

An authenticity determination system according to the present invention comprises a genuine product feature point registration apparatus and a matching determination apparatus.

The genuine product feature point registration apparatus includes: a first correlation value calculation device (first correlation value calculation means) for calculating a correlation value between a partial image within a genuine product image and a template image; a genuine product feature point extraction device (genuine product feature point extraction means) for extracting multiple feature points of the genuine product image where the correlation value calculated by the first correlation value calculation device is equal to or greater than a first threshold value; and a genuine product identification data storage device (genuine product identification data storage means) for storing genuine product identification data that includes the multiple feature points of the genuine product image extracted by the genuine product feature point extraction device. The matching determination apparatus includes: a second correlation value calculation device (second correlation value calculation means) for calculating a correlation value between a partial image within an authenticity verification product image and the template image; an authenticity verification product feature point extraction device (authenticity verification product feature point extraction means) for extracting multiple feature points of the authenticity verification product image where the correlation value calculated by the second correlation value calculation device is equal to or greater than a second threshold value; and a similarity calculation device (similarity calculation means) for calculating degree of similarity between the authenticity verification product image and the genuine product image using a geometric characteristic of the multiple feature points of the authenticity verification product image, which have been extracted by the authenticity verification product feature point extraction device, and a geometric characteristic of the multiple feature points of the genuine product image that have been stored in the genuine product identification data storage device.

Identification data regarding a genuine product image (genuine product identification data) is stored (registered) using the genuine product feature point registration apparatus. A "genuine product" refers to an officially manufactured article (genuine article or maker-specified article). Genuine product identification data is acquired (created) by image processing using a genuine product image that represents a genuine product, and includes multiple feature points (coordinate data thereof) of the genuine product image. A correlation value between a partial image, which is within an area that is a portion of the genuine product image, and a template image is calculated, and multiple positions (coordinates) within the genuine product image where the calculated correlation value is equal to or greater than a first threshold value are decided upon as the feature points of the genuine product image. The feature points thus determined are stored in the genuine product identification data storage device.

Multiple feature points (coordinates) regarding an authenticity verification product image representing an authenticity verification product are extracted using the matching determination apparatus. An "authenticity verification product" refers to a product under inspection to determine whether the product is the above-mentioned genuine product or an illicitly manufactured article (counterfeit, namely an article that is not genuine). Multiple feature points extracted with regard to an authenticity verification product image also are acquired (created) by image processing using the authenticity verification product image. A correlation value between a partial image, which is within an area that is a portion of the authenticity verification product image, and the template image are calculated, and multiple positions (coordinates) within the authenticity verification product image where the calculated correlation value is equal to or greater than a second threshold value are decided upon as the feature points of the authenticity verification product image. The first and second threshold values may be the same value or different values.

The degree of similarity (a numerical value expressing the degree of a match quantitatively) between the authenticity verification product image and the genuine product image is calculated using a geometric characteristic of the multiple feature points of the authenticity verification product image and a geometric characteristic of the multiple feature points of the genuine product image that have been stored in the genuine product identification data storage device. A geometric characteristic of multiple feature points includes the spacing between multiple feature points, or graphical shapes defined by connecting multiple feature points by straight lines, etc. Even if there is a difference in size between the authenticity verification product image and genuine product image and even if there is a rotational offset between the two, a degree of similarity is calculated that is robust with respect to these discrepancies. When the calculated degree of similarity is equal to or greater than a predetermined value, the authenticity verification product image will be identical with or will greatly resemble the genuine product and it can be inferred that the authenticity verification product image is a genuine product. Conversely, if the calculated degree of similarity is less than the predetermined value, then the authenticity verification product image will not be identical with (will not resemble) the genuine product and it can be inferred that the authenticity verification product image is not a genuine product (i.e., that it is a counterfeit).

In accordance with the present invention, a correlation value between an authenticity verification product image per se and a genuine product image per se is not calculated. Rather, the degree of similarity between the authenticity verification product image and the genuine product image is calculated using the geometric characteristic of multiple feature points of the authenticity verification product image and the geometric characteristic of multiple feature points of the genuine product image, and the authenticity of the authenticity verification product can be determined in accordance with the calculated degree of similarity. As a result, a high-speed authenticity determination can be carried out. The authenticity determination can be completed rapidly even if a large number of genuine product images exist.

Preferably, a template image identical with the template image used with respect to the genuine product image is used also with respect to the authenticity verification product image.

In an embodiment, the first correlation value calculation device with which the genuine product feature point registration apparatus is provided scans the genuine product image with the template image and calculates multiple correlation values conforming to positions of the template image in the genuine product image, and the genuine product feature point registration apparatus further includes: a device (means) for creating correlation-value two-dimensional array data by arraying the multiple correlation values in accordance with positions of the template image used in scanning; and a third correlation value calculation device (third correlation value calculation means) for scanning, with the template image, a correlation-value image represented by correlation-value image data (luminance image data) in which the correlation values in the correlation-value two-dimensional array data are used as luminance values, and calculating multiple correlation values conforming to positions of the template image in the correlation-value image, wherein the genuine product feature point extraction device extracts the feature points of the genuine product image, based upon the correlation values calculated by the third correlation value calculation device, instead of extracting the feature points of the genuine product image based upon the correlation values calculated by the first correlation value calculation device.

The genuine product image is scanned with the template image, multiple correlation values conforming to positions of the template image in the genuine product image are calculated and a correlation-value image is generated based upon the size and distribution (a two-dimensional array) of the calculated correlation values. Next, the generated correlation-value image is scanned with the template image and multiple correlation values conforming to positions of the template image in the correlation-value image are calculated. Feature points possessed by the genuine product image are emphasized in the correlation-value image. This makes it possible to improve the accuracy of the calculation of degree of similarity between the authenticity verification product image and the genuine product image using the geometric characteristic of multiple feature points of the authenticity verification product image and the geometric characteristic of multiple feature points of the genuine product image.

With regard to the matching determination apparatus as well, in a manner similar to that described above, the authenticity verification product image may be scanned with the template image, multiple correlation values conforming to positions of the template image in the authenticity verification product image may be calculated, a correlation-value image using the calculated multiple correlation values as luminance values may be generated, the generated correlation-value image may be scanned with the template image, and multiple correlation values conforming to positions of the template image in the correlation-value image may be calculated. Feature points possessed by the authenticity verification product image are emphasized in the correlation-value image.

Creation of the correlation-value two-dimensional array data, generation of the correlation-value image data and calculation of correlation values using the correlation-value image and the template image are repeated a plurality times. Thus the feature points possessed by the genuine product image and the feature points possessed by the authenticity verification product image can be further emphasized.

The genuine product identification data stored in the genuine product identification data storage device of the feature point registration apparatus may include data representing the genuine product image or data representing multiple partial images of a portion of the genuine product image that include respective ones of the multiple feature points of the genuine product image. By storing beforehand not only the feature points but also data representing the genuine product image or data representing multiple partial images that include respective ones of the multiple feature points of the genuine product image, it is possible to perform an additional (more accurate) authenticity determination in addition to the authenticity determination that is based upon calculation of degree of similarity between the authenticity verification product image and genuine product image using the geometric characteristic of multiple feature points of the authenticity verification product image and the geometric characteristic of multiple feature points of the genuine product image.

In an embodiment, the matching determination apparatus further includes a fifth correlation value calculation device (fifth correlation value calculation means) for calculating a correlation value between a partial image within the genuine product image and a partial image within the authenticity verification product image, in a case where the degree of similarity calculated by the similarity calculation device is equal to or greater than a third threshold value. Data representing the genuine product image that will be stored in the genuine product identification data storage device of the feature point registration apparatus or data representing multiple partial images that include respective ones of the multiple feature points of the genuine product image can be used in the calculation of the correlation value by the fifth correlation value calculation device. With regard to the image data representing the authenticity verification product image, it will suffice to apply this data to the matching determination apparatus when the correlation value is calculated by the fifth correlation value calculation device.

In accordance with the present invention, a correlation value between the genuine product image and the authenticity verification product image is calculated in a case where the degree of similarity calculated by the similarity calculation device is equal to or greater than the third threshold value. That is, processing proceeds to the calculation of a correlation value between the genuine product image and authenticity verification product image only in a case where it has been determined that the genuine product image and authenticity verification product image are comparatively similar in the authenticity determination that is based upon calculation of degree of similarity between the authenticity verification product image and genuine product image using the geometric characteristic of multiple feature points of the authenticity verification product image and the geometric characteristic of multiple feature points of the genuine product image. In particular, in a case where a large number of genuine product images exist, the correlation values between the genuine product image and authenticity verification product image are not calculated in brute-force fashion. This means that there will not be a major impediment to high-speed authenticity determination. With regard to a genuine product image that has been determined to be comparatively similar to an authenticity verification product image, the accuracy of the authenticity determination can be improved by calculating the correlation values between this genuine product image and the authenticity verification product image.

In an embodiment, the fifth correlation value calculation device with which the matching determination apparatus is provided scans the genuine product image with a correlation value calculation area (scanning window) and, moreover, scans also the authenticity verification product image with the correlation value calculation area, and calculates a correlation value between partial images of the genuine product image and authenticity verification product image at corresponding positions thereof within the correlation value calculation area. Correlation values are calculated with regard to the entire genuine product image and entire authenticity verification product image.

In another embodiment, the fifth correlation value calculation device with which the matching determination apparatus is provided calculates correlation values between multiple partial images that include respective ones of the multiple feature points of the genuine product image included in the genuine product identification data regarding the genuine product image and partial images of the authenticity verification product image at positions corresponding to the multiple partial images. If the genuine product identification data that will be stored in the genuine product identification storage device includes data representing multiple partial images that include respective ones of multiple feature points of the genuine product image, then a partial image of the genuine product image used in calculating correlation values may be a partial image represented by the multiple items of partial image data per se. If the genuine product identification data that will be stored in the genuine product identification storage device includes only data representing the genuine product image (image data representing the entire genuine product image), then a partial image of the genuine product image used in calculating correlation values may be created by extracting partial image data, which includes respective ones of the multiple feature points, from the data representing this genuine product image data.

Since a feature point is a location where a feature of the genuine product image appears prominently, a partial image that includes a feature point of the genuine product image can be said to be a partial image suitable for use in calculating a correlation value between the genuine product image and authenticity verification product image. By calculating a correlation value solely between a partial image that includes a feature point of the genuine product image and a partial image of the authenticity verification product image at a position corresponding to the first-mentioned partial image, the processing time for calculating the correlation value between the genuine product image and authenticity verification product image can be shortened without sacrificing almost any accuracy in the calculation of correlation value.

Preferably, the matching determination apparatus further comprises a positional registration device (positional registration means) for positionally registering (registering by translation, resizing or rotation) the authenticity verification product image and the genuine product image in accordance with a registration parameter, which is for eliminating relative offset between the genuine product image and authenticity verification product image, calculated based upon the multiple feature points of the authenticity verification product image extracted by the authenticity verification product feature point extraction device and the multiple feature points of the genuine product image that have been stored in the genuine product identification data storage device of the genuine product feature point registration apparatus.

The present invention provides also a feature point registration apparatus defined comprehensively as set forth below. Specifically, a feature point registration apparatus according to the present invention comprises: a first correlation value calculation device (first correlation value calculation means) for calculating, with regard to each of multiple target images, a correlation value between a partial image within the target image and a template image; a feature point extraction device (feature point extraction means) for extracting feature points of the target image where a correlation value calculated by the first correlation value calculation device is equal to or greater than a first threshold value; and an identification data storage device (identification data storage means) for storing target image identification data, which includes the feature points of the target image extracted by the feature point extraction device, with regard to each of the multiple target images. Even if a counterfeit article undistinguishable at a glance from a genuine article appears on the market, the determination as to whether this article is genuine or counterfeit can be made comparatively accurately and quickly by using the feature point registration apparatus to prepare beforehand target image identification data that includes the feature points of multiple target images, as described above.

Preferably, the first correlation value calculation device scans the target image with the template image and calculates multiple correlation values conforming to positions of the template image in the target image, and the feature point registration apparatus further includes: a device (means) for creating correlation-value two-dimensional array data by arraying the multiple correlation values in accordance with positions of the template image used in scanning; and a second correlation value calculation device (second correlation value calculation means) for scanning, with the template image, a correlation-value image represented by correlation-value image data in which the correlation values in the correlation-value two-dimensional array data are used as luminance values, and calculating multiple correlation values conforming to positions of the template image in the correlation-value image, wherein the feature point extraction device extracts the feature points of the target image, based upon the correlation values calculated by the second correlation value calculation device, instead of extracting the feature points of the target image based upon the correlation values calculated by the first correlation value calculation device. Emphasized feature points can be stored in the identification data storage device.

The present invention also provides a method of controlling operation of the above-described feature point registration apparatus.

The present invention further provides a matching determination apparatus used in the above-described authenticity determination system, as well as a method of controlling operation of this apparatus.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

Figure 1:
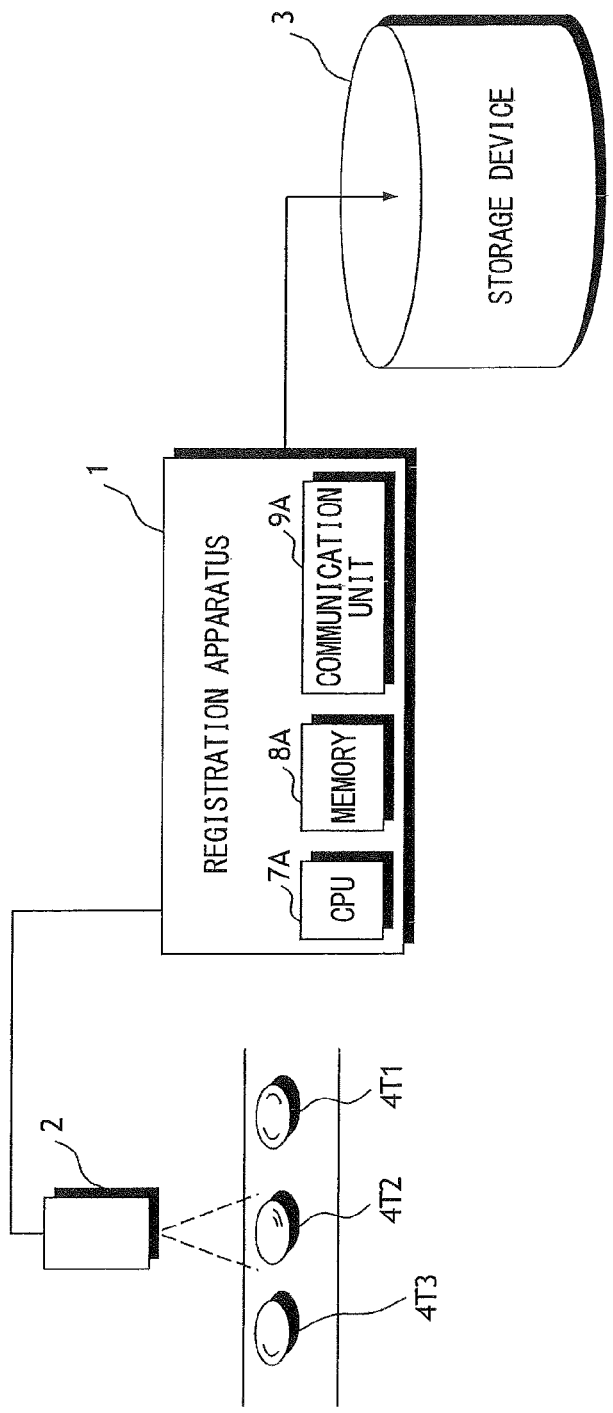
FIG. 1 is a block diagram illustrating the overall configuration of a tablet registration system.

FIG. 1 is a block diagram illustrating the overall configuration of a tablet registration system.

The tablet registration system registers data for identifying each of tablets 4T1, 4T2, 4T3, . . . manufactured at a pharmaceutical company (tablet pharmaceutical manufacturing company). The system is installed in a manufacturing line for manufacturing the tablets 4T1, 4T2, 4T3, . . . at the pharmaceutical company. The number of tablets 4T1, 4T2, 4T3, . . . for which registration of identification data by the tablet registration system has been completed are subsequently packaged and shipped. The tablets 4T1, 4T2, 4T3, . . . are of the same type and all of them are so-called genuine (official) tablets (referred to as "genuine tablets" below). Although the tablets 4T1, 4T2, 4T3, . . . are of the same type, a fine imprint on the surface of the tablets differs for each of the tablets 4T1, 4T2, 4T3, . . . .

The tablet registration system has a registration apparatus 1, an imaging unit 2 and a storage device 3.

The registration apparatus 1 is a computer system having a CPU 7A, memory 8A and communication unit 9A, etc. A program that causes the computer system to function as the registration apparatus constituting the tablet registration system is installed. By executing the program, the computer system functions as the registration apparatus 1.

The imaging unit 2 includes an image sensor (such as a CCD or CMOS) for imaging the tablets 4T1, 4T2, 4T3, . . . (the surface of each tablet) and outputs image data representing the tablets 4T1, 4T2, 4T3, . . . the images of which are formed on the image sensor. The image data representing the tablets 4T1, 4T2, 4T3, . . . that has been output from the imaging unit 2 is input to the registration apparatus 1. As will be described later, the registration apparatus 1 creates identification data (referred to below as "genuine tablet identification data") specific to each of the tablets 4T1, 4T2, 4T3, . . . using the respective items of image data representing the tablets 4T1, 4T2, 4T3, . . . that have been input. The genuine tablet identification data created is stored in the storage device 3.

Figure 2:
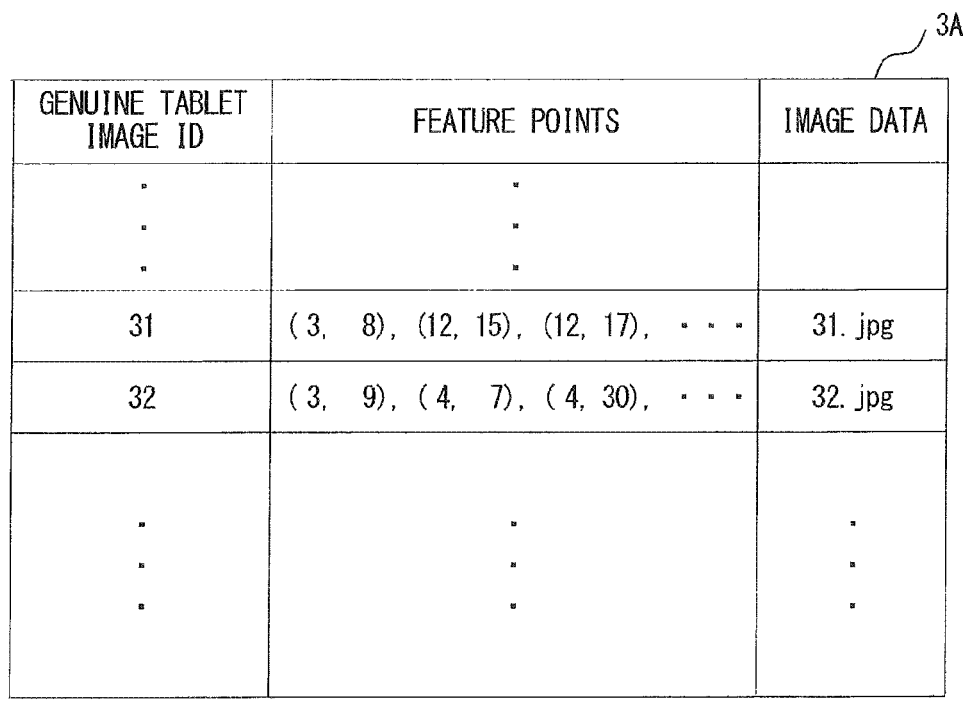
FIG. 2 illustrates genuine tablet identification data.

FIG. 2 illustrates an example of genuine tablet identification data 3A stored in the storage device 3.

The genuine tablet identification data 3A is created with regard to each of the number of tablets 4T1, 4T2, 4T3, . . . , as mentioned above. The items of row data of the genuine tablet identification data 3A shown in FIG. 2 are items of genuine tablet identification data specific to the tablets 4T1, 4T2, 4T3, . . . , respectively.

The items of genuine tablet identification data 3A created with regard to respective ones of the tablets 4T1, 4T2, 4T3, . . . include a genuine tablet image ID (recorded image ID), data representing feature points and image data representing the image of the genuine tablet that is output by the imaging unit 2. The genuine tablet image IDs are unique numbers assigned to respective ones of the tablets 4T1, 4T2, 4T3, . . . (respective ones of the items of genuine tablet identification data that are output as a result of imaging the tablets 4T1, 4T2, 4T3, . . . by the imaging unit 2) and are numbered sequentially by the registration apparatus 1. Feature points are sets of x and y coordinates that specify locations (addresses) of multiple feature points in the genuine tablet image.

Figure 3:
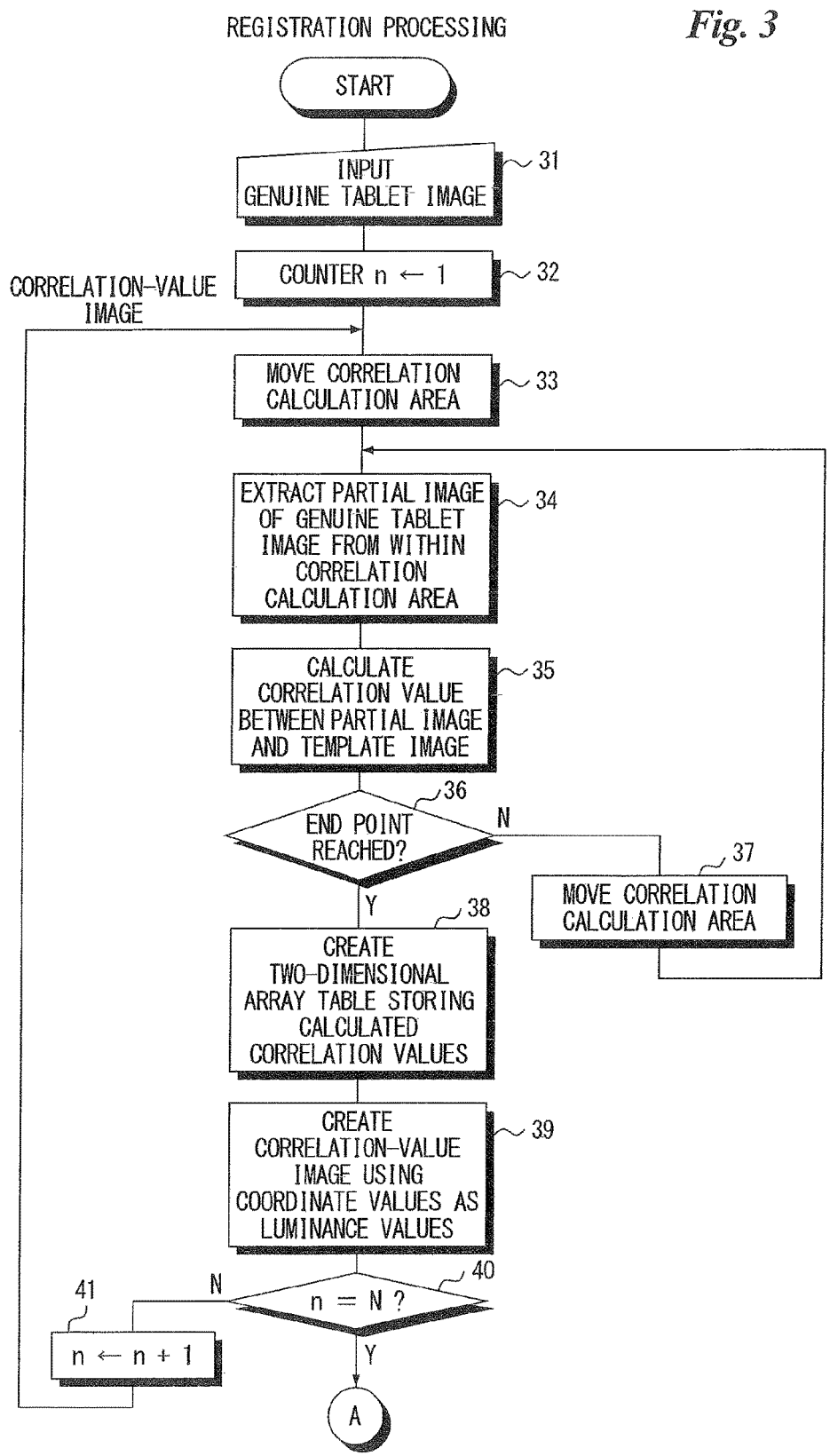
FIGS. 3 and 4 are flowcharts illustrating operation of a registration apparatus of the tablet registration system.
Figure 4:
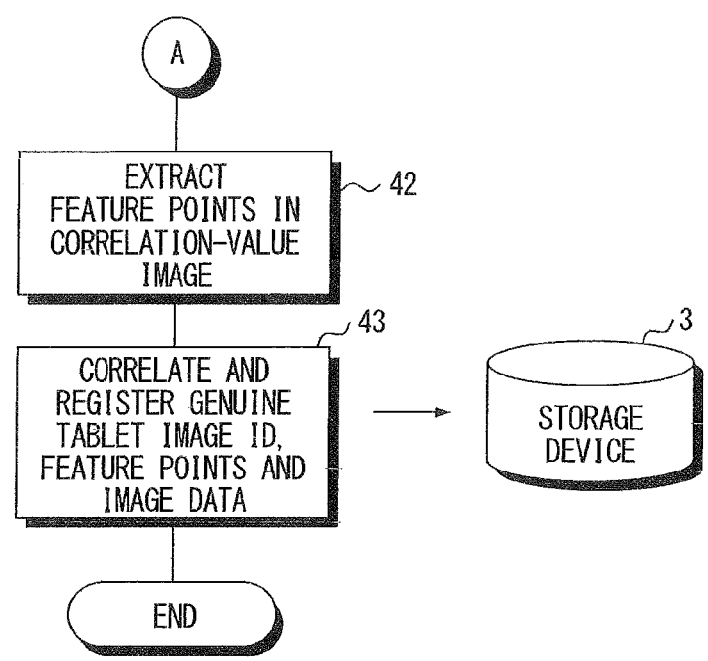

FIGS. 3 and 4 show the operation of the registration apparatus 1 of the tablet registration system and illustrate the flow of processing for creating the above-described genuine tablet identification data 3A and storing the data in the storage device 3.

Image data representing a genuine tablet image that has been output by the imaging unit 2 is input to the registration apparatus 1 (step 31). After a counter n for sensing a predetermined number N of processing iterations, described later, is initialized (n=1) (step 32), control proceeds to normalized correlation calculation processing (steps 33 to 35).

Figure 5:
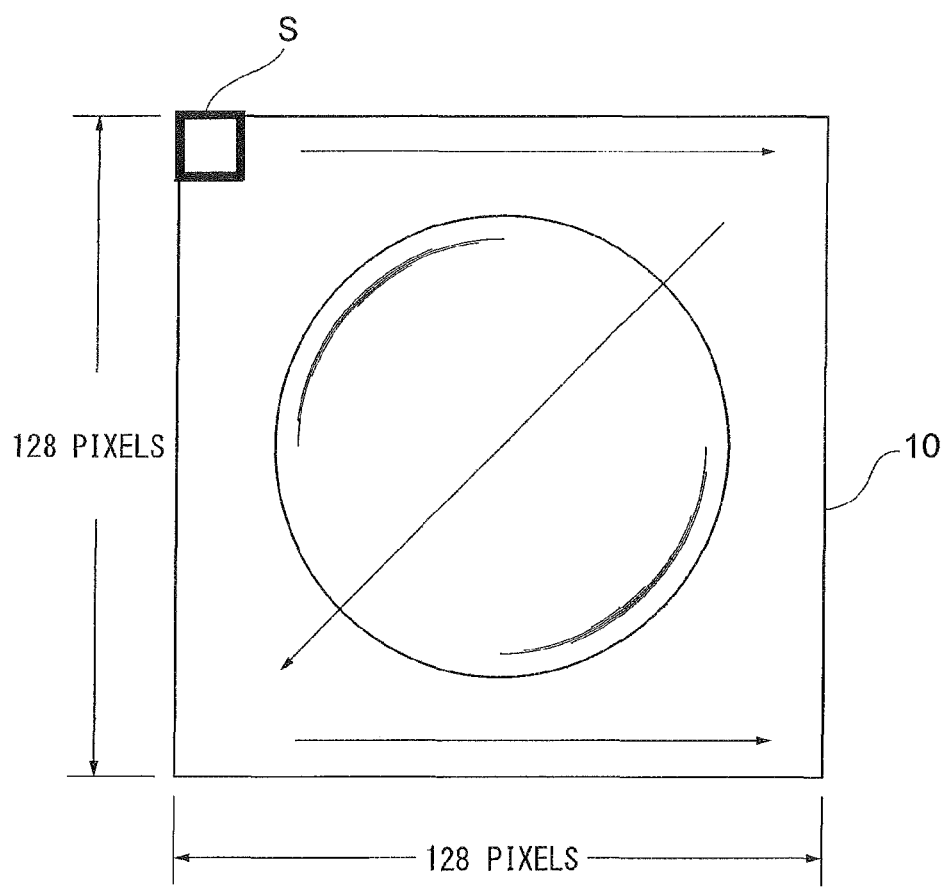
FIG. 5 illustrates the manner of normalized correlation calculation processing.
Figure 6:
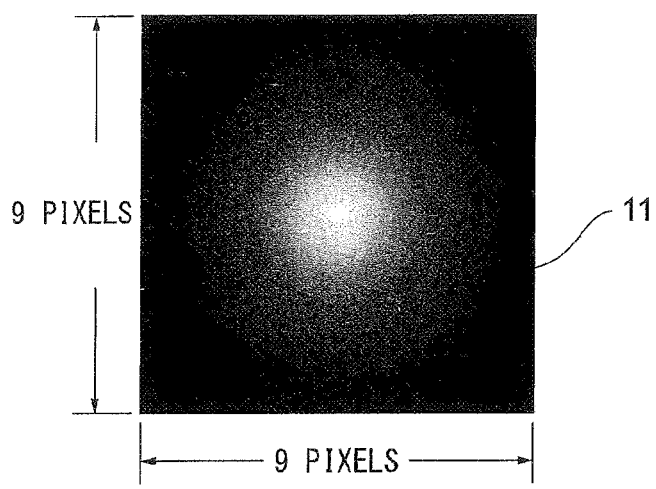
FIG. 6 illustrates a template image.

FIG. 5, which illustrates the manner of normalized correlation calculation processing, shows the relationship between a genuine tablet image 10 and a correlation calculation area (window) S. FIG. 6 illustrates an example of a template image (local filter) 11 used in normalized correlation calculation processing.

In normalized correlation calculation processing, a normalized correlation value r is calculated between the template image 11 and a partial image within the correlation calculation area S, which partial image is part of the genuine tablet image 10. With reference to FIG. 5, both the genuine tablet image 10 and correlation calculation area S are rectangles and, by way of example, the genuine tablet image 10 has a size of 128×128 pixels and the correlation calculation area S a size of 9×9 pixels. The template image 11, which is shown enlarged in FIG. 6, has a size of 9×9 pixels, which is the same as that of the correlation calculation area S.

The correlation value r is calculated using the partial image, within the correlation calculation area S, extracted from the genuine tablet image 10, and the template image 11. Various known algorithms, such as NCC (Normalized Cross-Correlation) and ZNCC (Zero-mean Normalized Cross-Correlation) can be used in the normalized correlation processing for calculating the correlation value r. The correlation value may be calculated using SSD (Sum of Squared Difference) or SAD (Sum of Absolute Difference).

The correlation calculation area S is moved a predetermined distance incrementally (one pixel at a time, for example) horizontally and vertically within the genuine tablet image 10 and the correlation value r between the partial image within the correlation calculation area S and the template image 11 is calculated whenever the correlation calculation area S is moved.

There are various types of template image 11 used in normalized correlation calculation. The template image 11 shown in FIG. 6 is based upon a two-dimensional normal distribution and is such that the luminance of the template image is highest at the center thereof and diminishes gradually in the form of concentric circles as distance from the center increases. By performing a normalized correlation calculation using the template image 11 of this kind, a correlation value r that is robust with respect to rotation can be obtained. Further, when the template image 11 is used, a large correlation value r is calculated with regard to a partial image having a high luminance and small correlation value r is calculated with regard to a partial image having a low luminance. The normalized correlation value r calculated has a range of values of from −1 to +1.

FIGS. 7 to 11 illustrate other template images 11a to 11e.

Figure 7:
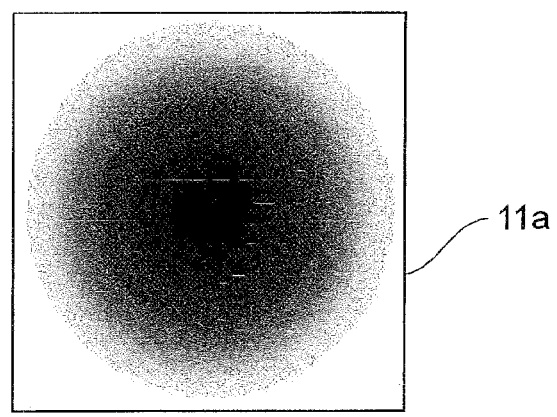
FIGS. 7 to 11 illustrate other template images.
Figure 8:
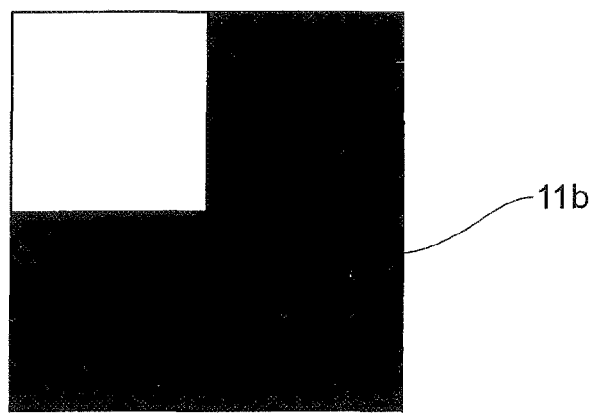
Figure 9:
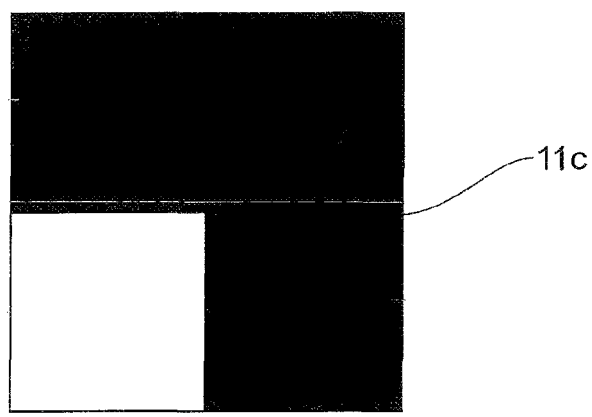
Figure 10:
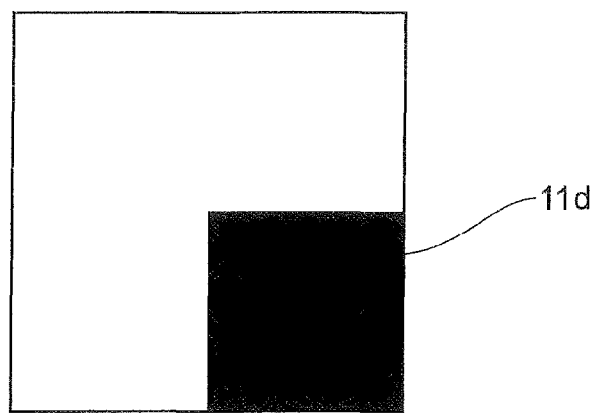
Figure 11:
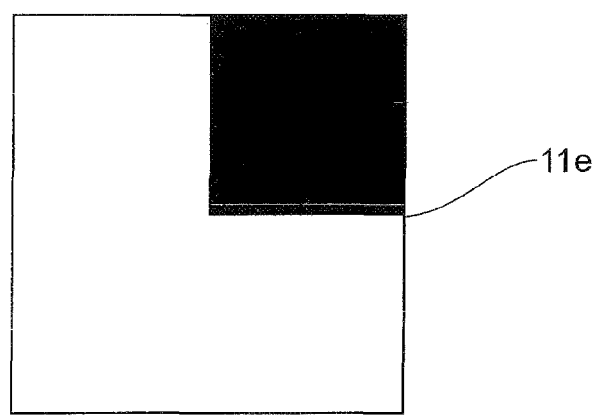

The template image 11a shown in FIG. 7 is based upon a two-dimensional normal distribution. This template image is such that the luminance of the template image is lowest at the center thereof and rises gradually in the form of concentric circles as distance from the center increases. By performing the normalized correlation calculation with respect to the partial image using the template image 11a, a correlation value r that is robust with respect to rotation is calculated. When the template image 11a is used, a large correlation value r is calculated with regard to a partial image having a low luminance and a small correlation value r is calculated with regard to a partial image having a high luminance.

Template images 11b to 11e shown in FIGS. 8 to 11, respectively, are such that the luminance at one corner of the four corners of a rectangle differs from the luminance at the three remaining corners. By performing the normalized correlation calculation with respect to the partial image using the template images 11b to 11e, a correlation value r that is robust with respect to scaling (resizing) is calculated and a correlation value having a large value is calculated with regard to a partial image in which an edge is present.

With reference again to FIG. 3, the correlation calculation area S is moved to a starting point at the upper-left corner of the genuine tablet image 10 that has been input (step 33; see FIG. 5). Data representing the partial image within the correlation calculation area S is extracted (step 34). A normalized correlation calculation is performed between the extracted partial image and the above-described template image (here it is assumed that use is made of the template image 11 shown in FIG. 6), whereby the correlation value r is calculated (step 35).

It is determined whether the correlation calculation area S has reached an end point (the lower-right corner of the genuine tablet image 10) (step 36). If the end point has not been reached ("NO" at step 36), the correlation calculation area S is moved (scans) in the horizontal or vertical direction (step 37) and the partial image within the correlation calculation area S after the movement thereof is extracted (step 34). The correlation value r between the newly extracted partial image and the template image 11 is calculated (step 35).

If movement of the correlation calculation area S ends and it reaches the end point ("YES" at step 36), a two-dimensional array table containing a number of calculated correlation values r is created (step 38). The array (row and column directions) of the number of correlation values r in the two-dimensional array table corresponds to positions of the correlation calculation area S in the genuine tablet image 10.

Data representing a correlation-value image [an image composed of a number of pixels having brightness conforming to the correlation values r (=luminance values)] (a luminance image), in which the number of correlation values r stored in the two-dimensional array table are used as luminance values (density values), is created (step 39). The correction value r has a range of values of from −1 to +1. For example, by mapping to luminance value 0 the correlation value r having the smallest value among the number of correlation values r that have been stored in the two-dimensional array table and mapping to luminance value 255 the correlation value r having the largest value, a correlation-value image is created by 256 levels of brightness. Naturally, if the correlation values r contained in the two-dimensional array table are expressed beforehand by 8-bit (0 to 255) data, then the two-dimensional array data can be used as the correlation-value image data as it stands.

It is determined whether the counter n has attained the predetermined iteration number N (step 40). If the predetermined iteration number has not been attained ("NO" at step 40), then the counter n is incremented (step 41), the correlation-value image that has been created is adopted as an image to undergo processing, scanning by the correlation calculation area S (extraction of a partial image) (steps 33, 34), calculation of correlation values between the partial image within the correlation calculation area S and the template image (step 35), creation of a two-dimensional array table (step 38) and generation of a correlation-value image (step 39) are repeated. For example, if iteration number N=4 holds, then the above-described processing is repeated four times.

Figure 12:
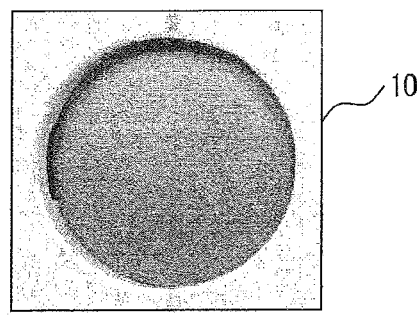
FIG. 12 illustrates a genuine tablet image.
Figure 13:
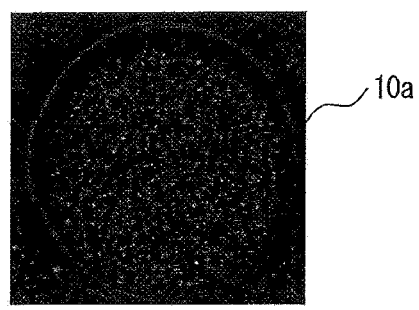
FIGS. 13 and 14 illustrate correlation-value images.
Figure 14:
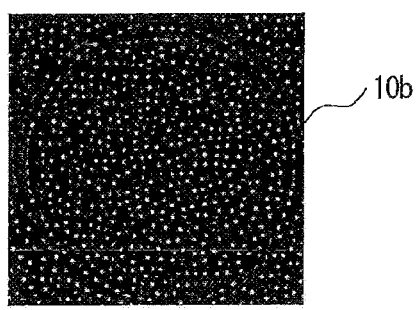

FIG. 12 illustrates the genuine tablet image 10, FIG. 13 a correlation-value image 10*a* created by subjecting the genuine tablet image 10 of FIG. 12 to the above-described normalized correlation calculation one time, and FIG. 14 a correlation-value image 10*b* obtained by applying the above-described normalized correlation calculation four times. By repeating the normalized correlation calculation multiple times, the correlation values r (=luminance values) are gradually emphasized and the correlation-value image 10*b*, in which the luminance (brightness) of pixels at locations corresponding to the emphasized correlation values is emphasized, is created.

With reference to FIG. 4, the location (coordinates) of a pixel having a luminance value that is equal to or greater than a predetermined threshold value is determined as a feature point in the genuine tablet image 10 by using the created correlation-value image and is extracted (step 42). In general, multiple feature points are extracted.

Figure 15:
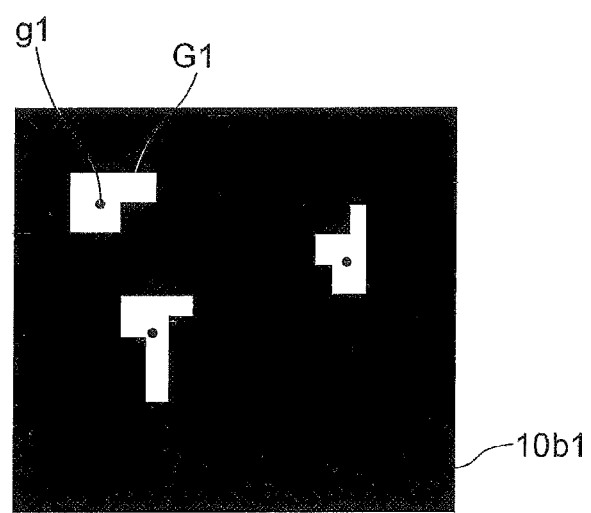
FIG. 15 illustrates a portion of a correlation-value image in enlarged form.

FIG. 15 illustrates an enlarged image 10*b*1 of part of the above-described correlation-value image 10*b* (see FIG. 14). In processing for extracting feature points (step 42), if a plurality of pixels having luminance values equal to or greater than a predetermined threshold value are clustered together (contiguous), a single feature point (coordinates) may be made to correspond to this pixel cluster. In this case, multiple contiguous pixels having luminance values equal to or greater than the predetermined threshold value are formed into a group. Pixel clusters formed into three groups are indicated, one of which is indicated by characters G1. For example, the coordinates of center of gravity g1 of a pixel group G1 are treated as a feature point with regard to the pixel group G1. The coordinates of the center of a circumscribed rectangle or inscribed rectangle of the pixel group G1, instead of the center of gravity, may be adopted as the feature point of the pixel group G1.

A genuine tablet image ID and image data are correlated with the extracted plurality of feature points (coordinates), thereby creating the genuine tablet identification data 3A (see FIG. 2) that includes the genuine tablet image ID, feature points and image data. The genuine tablet identification data 3A thus created is stored in the storage device 3 (step 43) as described above. By applying similar processing to each of the number of tablets 4T1, 4T2, 4T3, . . . , genuine tablet identification data 3A is created for each of the tablets 4T1, 4T2, 4T3, . . . and is stored in the storage device 3.

Further, it may be arranged so that correlation values r are calculated using each of a plurality (e.g., two) of template images among the above-described multiple template images 11, 11*a* to 11*e*, and the feature points are extracted through processing similar to that described above. Feature points extracted with respect to one genuine tablet image can be increased. Further, even in a case where a template image of one type (e.g., template image 11) is used, the feature points extracted with respect to one genuine tablet image can be increased by distinguishing each sign (− of +) of the correlation value r calculated.

Figure 16:
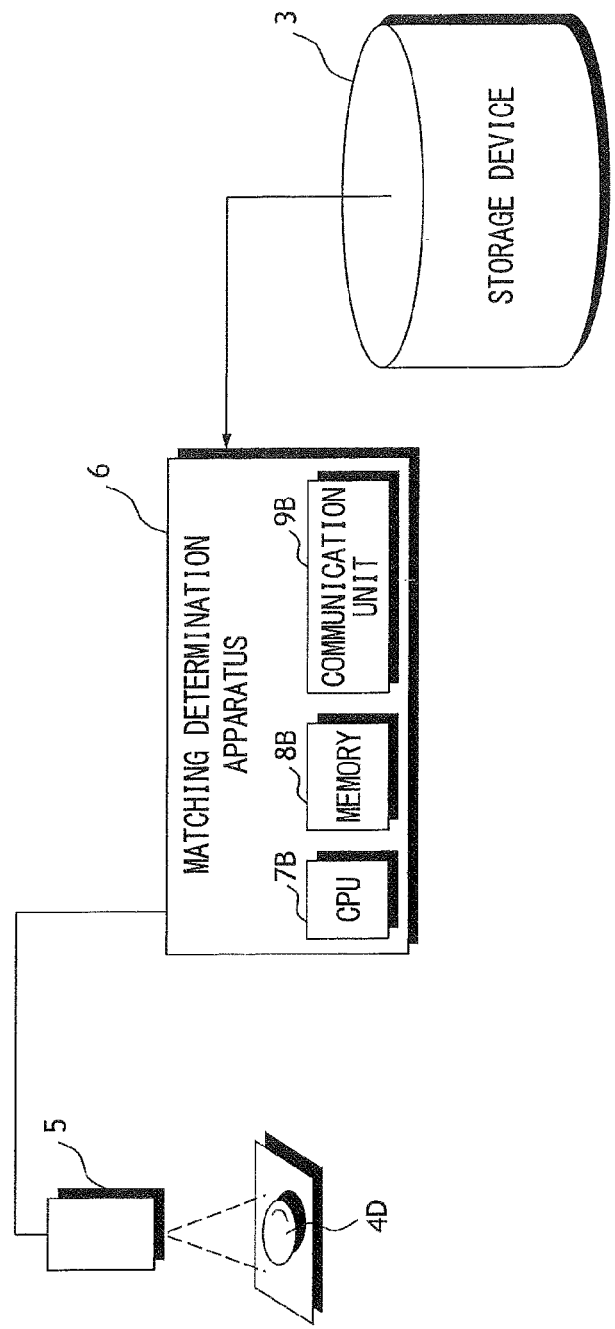
FIG. 16 is a block diagram illustrating the overall configuration of a matching determination system.

FIG. 16 is a block diagram illustrating the overall configuration of a matching determination system.

Using the genuine tablet identification data 3A that has been stored in the storage device 3 of the above-described tablet registration system, the matching determination system performs a matching and determination operation to determine whether a tablet 4D brought to this system is a genuine tablet or not (whether it is a counterfeit tablet or not).

The matching determination system includes a matching determination apparatus 6, an imaging unit 5 and the storage device 3. In a manner similar to that of the registration apparatus 1 described above, the matching determination apparatus 6 also is a computer system having a CPU 7B, memory 8B and communication unit 9B, etc. By executing a program that causes this computer system to function as the matching determination apparatus 6, the computer system functions as the matching determination apparatus 6 constituting the matching determination system. In this embodiment, the storage device 3 is illustrated as a storage device identical with the storage device 3 that constitutes the tablet registration system described above. For example, by connecting the storage device 3 of the tablet registration system to the matching determination apparatus 6, which constitutes the matching determination system, via a network (such as the Internet), the storage device 3 of the tablet registration system can be incorporated in the matching determination system. Naturally, the genuine tablet identification data 3A that has been stored in the storage device 3 of the tablet registration system may be downloaded (copied) to and stored in a storage device with which the matching determination system is provided.

Figure 17:
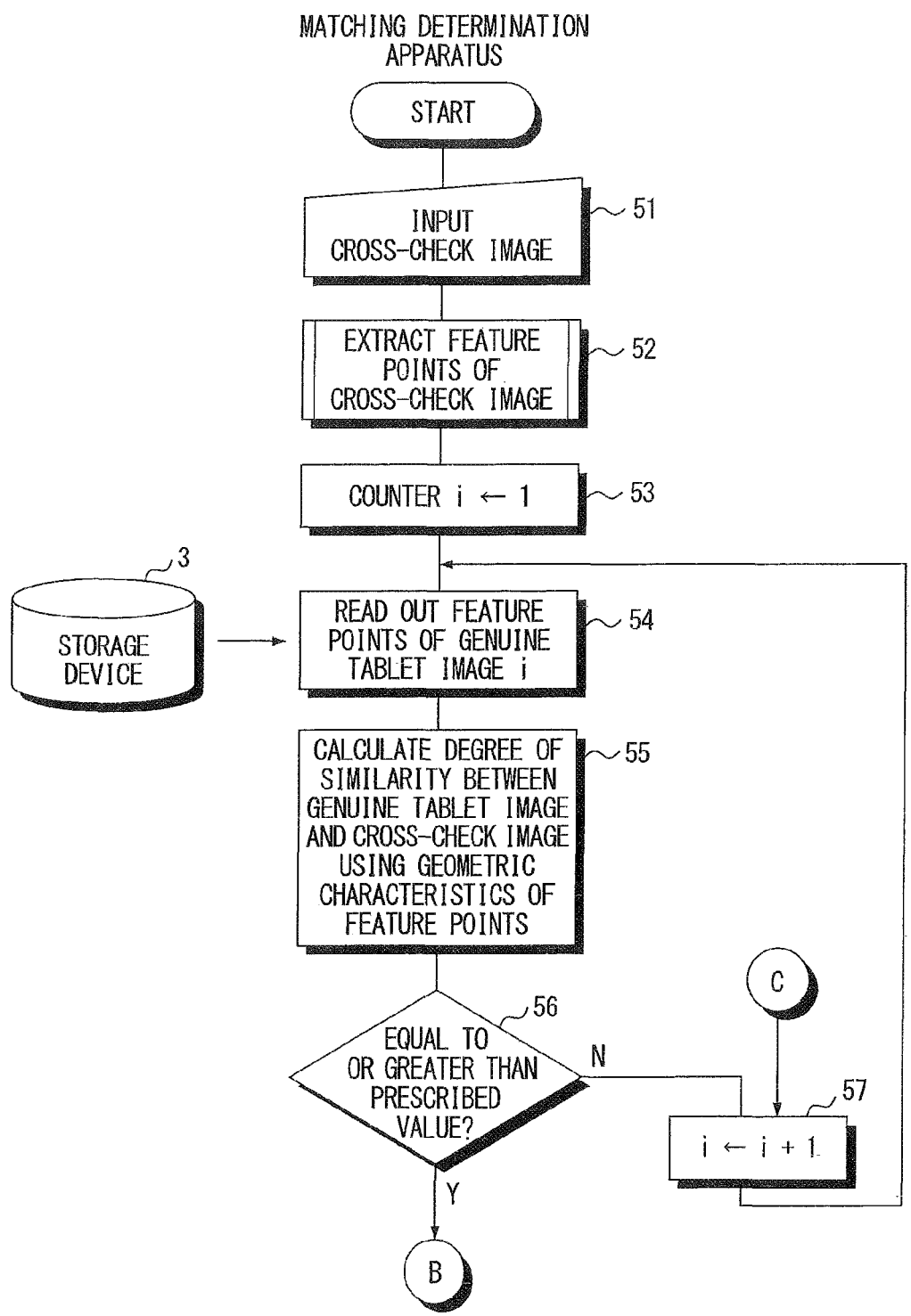
FIGS. 17 to 19 are flowcharts illustrating operation of a matching determination apparatus of the matching determination system.
Figure 18:
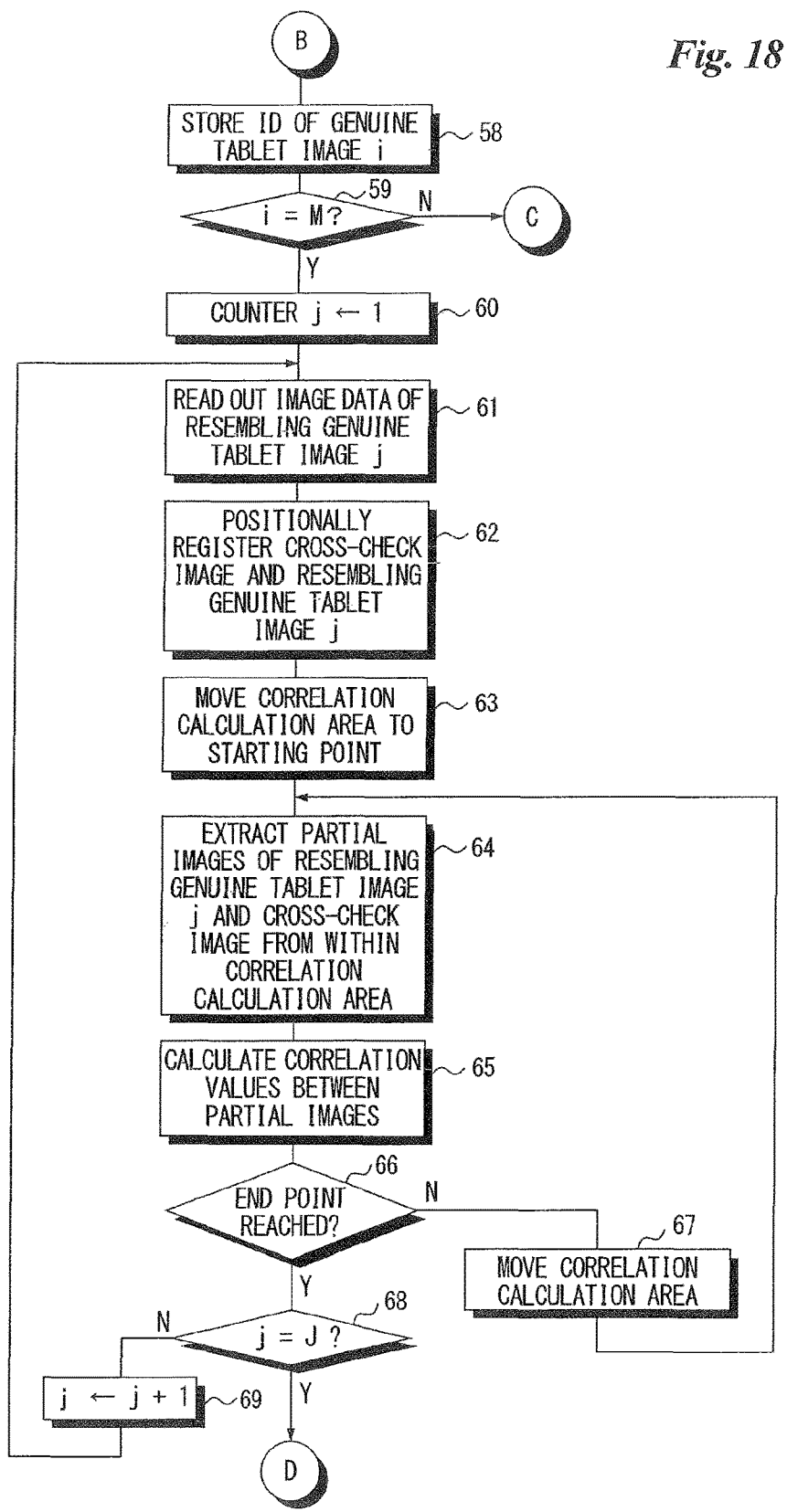
Figure 19:
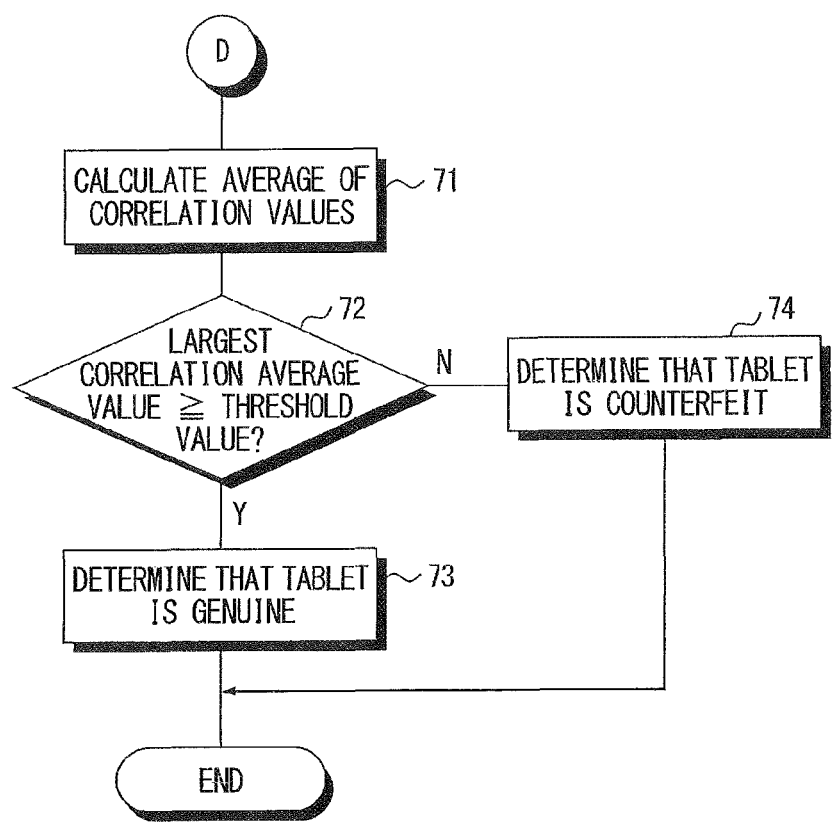

FIGS. 17 to 19 show the operation of the matching determination apparatus 6 in the matching determination system and illustrate the flow of processing (authenticity determination) for determining whether the tablet 4D is genuine or not (counterfeit or not).

In the matching determination system, determination processing is executed in the two stages described below.

The first stage of determination processing uses the feature points (see FIG. 2), which are included in the genuine tablet identification data 3A with regard to each of the number of tablets 4T1, 4T2, 4T3, . . . stored beforehand in the storage device 3 of the tablet registration system, to determine whether an image that resembles the image of the tablet 4D, which is the target of the authenticity determination and is imaged and output by the imaging unit 5 of the matching determination system, exists among genuine tablet images obtained by imaging the tablets 4T1, 4T2, 4T3, . . . by the imaging unit 2 of the tablet registration system.

The second stage of the determination processing, in a case where it has been determined in the first stage of determination processing that an image resembling the image of the tablet 4D undergoing authenticity determination exists among the genuine tablet images, calculates correlation values between the image of the tablet 4D and the genuine tablet image that has been determined to resemble it and, in a case where the calculated correlation values are higher than a predetermined threshold value, determines that an image identical with the image of the tablet 4D is included among the multiple genuine tablet images, namely that the tablet 4D is a genuine tablet.

The first and second stages of determination processing set forth above will now be described in detail in line with the flowcharts of FIGS. 17 to 19. First, the tablet 4D undergoing authenticity determination is imaged by the imaging unit 5 and data representing the image of the tablet 4D (referred to as a "cross-check image" 20 below) is output from the imaging unit 5. The data representing the cross-check image 20 is input to the matching determination apparatus 6 (step 51).

The cross-check image 20 is subjected to processing the same as that executed by the registration apparatus 1 of the above-described tablet registration system, whereby the feature points (coordinates) (see FIG. 2) of the cross-check image 20 are extracted (step 52). In general, multiple feature points are extracted with regard to the cross-check image 20. In order to extract feature points that correspond to the feature points extracted in the tablet registration system, a normalized correlation calculation according to an algorithm identical with the algorithm of the normalized correlation calculation executed in the tablet registration system is executed in the matching determination system as well, and a template image identical with the template image used in the tablet registration system is used in the matching determination system as well.

A counter i is initialized (i=1) and multiple feature points (coordinates) regarding a genuine tablet image i are read out of the storage device 3 (steps 53, 54).

The degree of similarity between the genuine tablet image i and the cross-check image 20 is calculated using the multiple feature points of the genuine tablet image i read out of the storage device 3 and the multiple feature points extracted regarding the cross-check image 20 (step 55). The geometric hashing method, for example, can be used in calculating the degree of similarity between two images that utilize the positions (coordinates) of multiple feature points. According to the geometric hashing method, the degree of similarity between two target models (here the genuine tablet image i and the cross-check image 20) is expressed by a numerical value by using geometric characteristics (a geometric structural expression that is invariant to translation, scaling and rotation) defined by multiple feature points (coordinates). Instead of geometric hashing, the LLHA (Locally Likely Arrangement Hashing) method may be used. According to the LLHA method as well, a numerical value representing the degree of similarity between two images is calculated based upon the geometric characteristics of multiple feature points (coordinates) of each of the two images. With geometric hashing and LLHA, a positional-offset relationship, resizing relationship and rotational-angle relationship between the genuine tablet image i and the cross-check image 20 are also detected in the process of calculating the degree of similarity. Specifically, with geometric hashing and LLHA, amounts of offset between the multiple feature points of the genuine tablet image i and the multiple feature points of the cross-check image 20 corresponding to said feature points are found and a positional registration parameter (motion parameter, resizing parameter, rotation parameter) for eliminating the relative offset between the genuine tablet image i and the cross-check image 20 thereby also is calculated along with the degree of similarity.

It is determination whether the calculated degree of similarity is equal to or greater than a predetermined threshold value (step 56). If the degree of similarity between the genuine tablet image i and the cross-check image 20 is less than the predetermined threshold value ("NO" at step 56), then it is determined that the genuine tablet image i does not resemble (is different from) the cross-check image 20 ("NO" at step 56) and the counter i is incremented (step 57). The feature points (coordinates) of the next genuine tablet image i stored in the storage device 3 are read out and the above-mentioned degree of similarity is re-calculated (steps 54, 55).

If the degree of similarity between the genuine tablet image i and the cross-check image 20 is equal to or greater than the predetermined threshold value ("YES" at step 56), then the genuine tablet image ID (see FIG. 2) of this genuine tablet image i is stored temporarily in the memory of the matching determination apparatus 6 (step 58).

It is determined whether the count in counter i agrees with a total number M of items of genuine tablet identification data 3A that have been stored in the storage device 3, namely whether the calculation of degree of similarity between all of the genuine tablet images i and the cross-check image 20 has ended (step 59). If a genuine tablet image i for which the degree of similarity has not been calculated exists ("NO" at step 59), then the counter i is incremented (step 57) and calculation of the degree of similarity using the feature points of the next genuine tablet image i and the feature points of the cross-check image 20 is carried out (step 55).

At step 58, in the manner described above, the genuine tablet image IDs of genuine tablet images i for which the degree of similarity with respect to the cross-check image 20 is equal to or greater than the predetermined threshold value are stored in memory one after another. When calculation of degree of similarity between all genuine tablet images i and the cross-check image 20 is finished ("YES" at step 59), control proceeds to the second stage of determination processing. Here will be described a case where multiple genuine tablet image IDs have been stored in memory at step 58, namely a case where multiple (j) genuine tablet images (such a tablet image will be referred to as a "resembling genuine tablet image j") that resemble the cross-check image 20 have been found. The second stage of determination processing set forth below is executed with regard to each of the multiple resembling genuine tablet images j (j=1, 2, . . . , J).

First, a counter j is initialized (j=1) and image data regarding one of the multiple resembling genuine tablet images j is read out of the storage device 3 (steps 60, 61).

The cross-check image 20 is positionally moved (translated), resized and rotated in accordance with the positional-offset relationship, resizing relationship and rotational-angle relationship [positional registration parameter (motion parameter, resizing parameter, rotation parameter)] detected in the above-described calculation of degree of similarity, whereby the cross-check image 20 is brought into positional registration (corrected for offset) with the resembling genuine tablet image j. The resembling genuine tablet image j may be positionally registered instead of the cross-check image 20.

Figure 20:
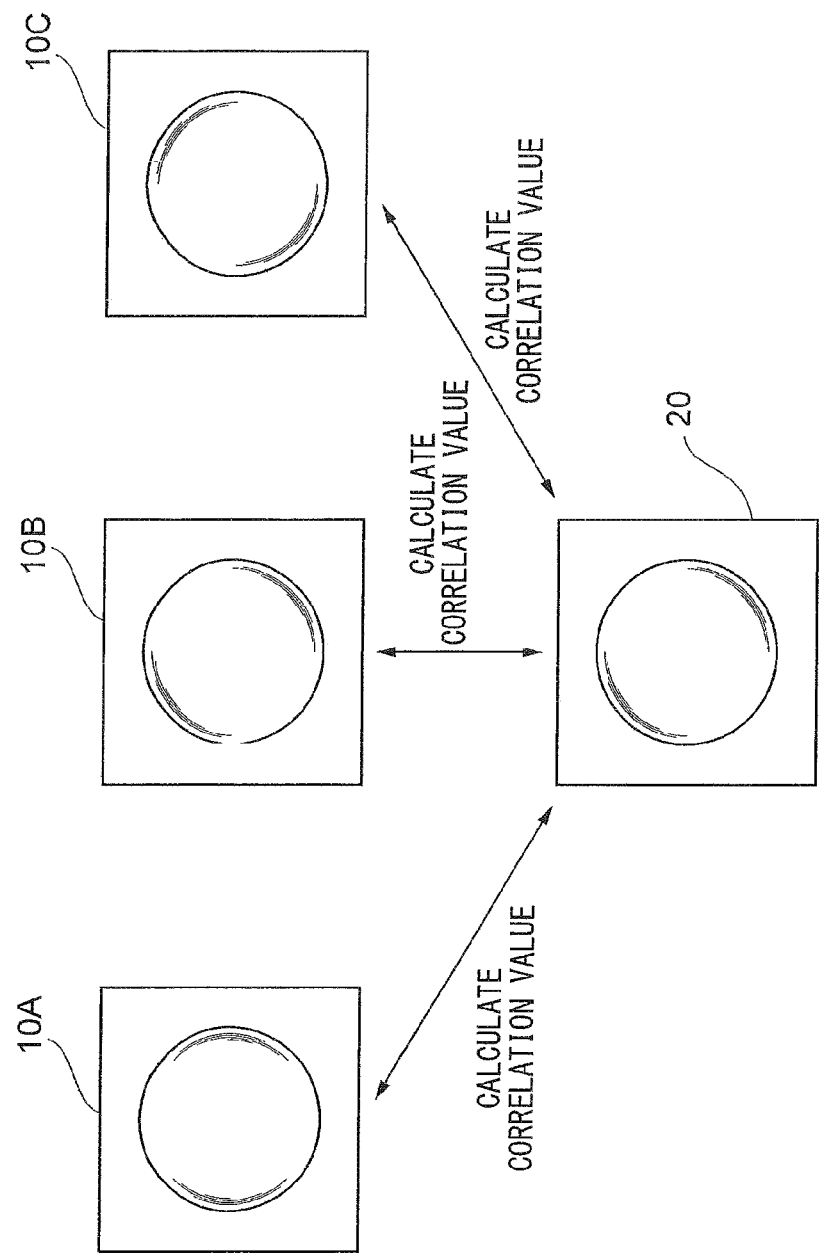
FIG. 20 illustrates how correlation values are calculated between a cross-check image and three resembling genuine tablet images.

Processing proceeds to normalized correlation calculation (steps 63 to 65). In the normalized correlation calculation performed here, the resembling genuine tablet image j and the cross-check image 20 are used and not the above-mentioned template image (local filter) 11 (FIG. 6). As illustrated in FIG. 20, correlation values r between the cross-check image 20 and respective one of resembling genuine tablet images (three resembling genuine tablet images 10A, 10B and 10C are shown in FIG. 20) are calculated in a manner described below.

Figure 21:
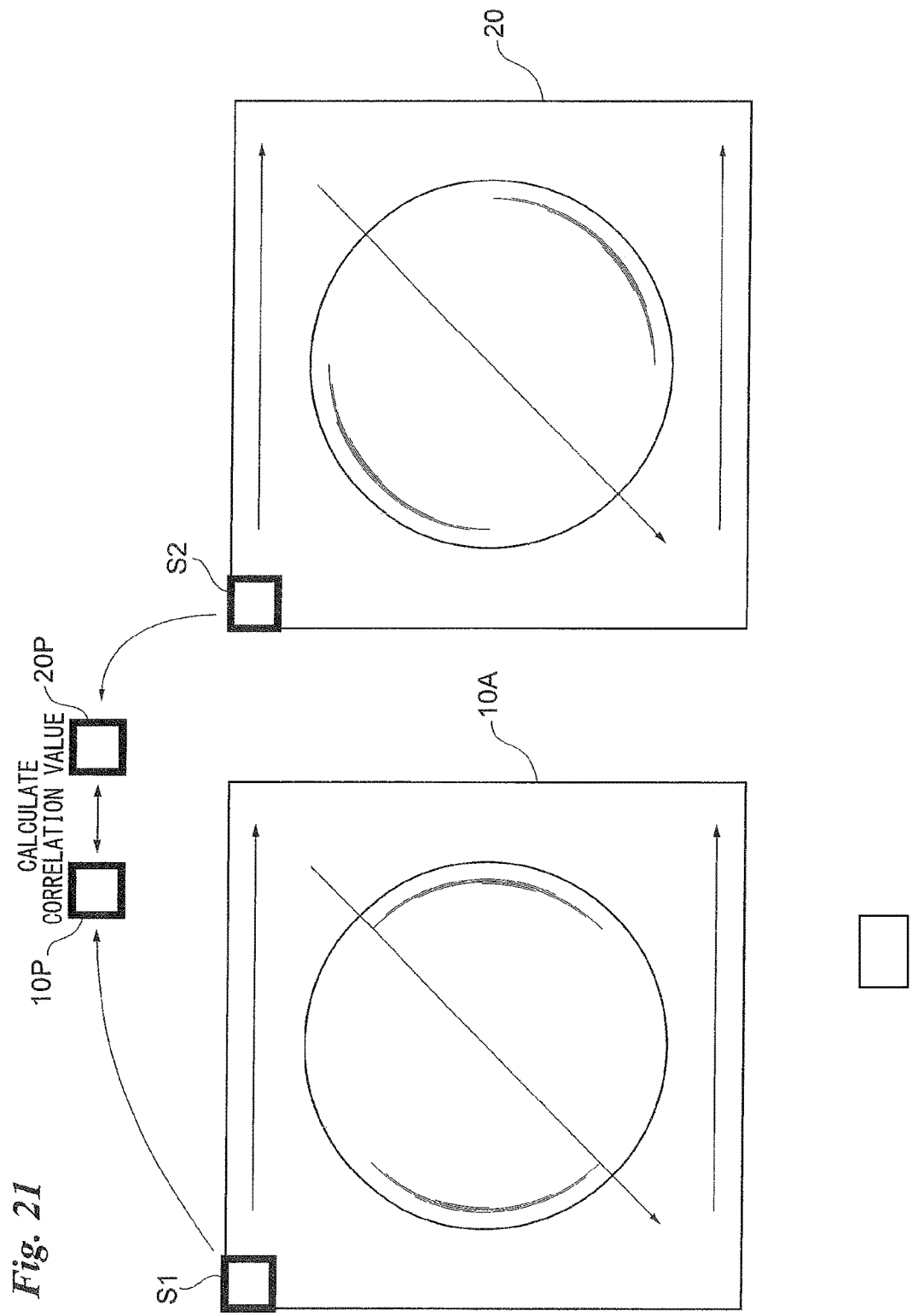
FIG. 21 illustrates the manner of a normalized correlation calculation performed between a cross-check image and a resembling genuine tablet image.

FIG. 21 illustrates the manner of a normalized correlation calculation performed between the resembling genuine tablet image 10A and the cross-check image 20. Correlation calculation areas (windows) S1 and S2 are set for the resembling genuine tablet image 10A and cross-check image 20, respectively, and partial images 10P and 20P within the correlation calculation areas S1 and S2, respectively, are extracted. A normalized correlation calculation is performed between the extracted partial images 10P and 20P. Any known algorithm such as the above-mentioned NCC or ZNCC can be used in the normalized correlation calculation.

With reference again to FIG. 18, the correlation calculation areas S1 and S2 are moved to starting points in the genuine tablet image 10A and cross-check image 20, respectively (step 63). The partial images 10P and 20P within the correlation calculation areas S1 and S2, respectively, are extracted (step 64). Correlation values between the partial image 10P within the correlation calculation area S1 of resembling genuine tablet image 10A and the partial image 20P within the correlation calculation area S2 of cross-check image 20 are calculated (step 65).

It is determined whether the correlation calculation areas S1, S2 are situated at their end points (step 66). If the correlation calculation areas have not reached their end points ("NO" at step 66), the correlation calculation areas S1, S2 are moved horizontally or vertically (step 67) and correlation values between partial images are calculated again (steps 64, 65).

When the end points are reached, the counter j is incremented and processing proceeds to calculation of correlation value between the next resembling genuine tablet image j and the cross-check image 20 ("YES" at step 66, "NO" at step 68, step 69, steps 61 to 65).

When calculation of correlation values r between all resembling genuine tablet images j and the cross-check image 20 is finished ("YES" at step 68), a number of average values of the correlation values calculated between respective ones of multiple resembling genuine tablet images j and the cross-check image 20 is calculated (step 71) and it is determined whether the average correlation value having the largest value among these averages is equal to or greater than a predetermined threshold value (step 72). If the average correlation value having the largest value is equal to or greater than the threshold value, then it is determined that the resembling genuine tablet image (resembling genuine tablet image 10B shown in FIG. 20, for example) that was used in calculating the average correlation value having the largest value is identical with the cross-check image 20 and, in such case, it is determined that the tablet 4D that is undergoing the authenticity determination, and which was used in imaging of the cross-check image 20, is a genuine tablet ("YES" at step 72; step 73). For example, a determination result to the effect that the tablet 4D is genuine is displayed on the display screen of a display unit connected to the matching determination apparatus 6.

If the average correlation value having the largest value is less than the predetermined threshold value, then it is judged that the genuine tablet image, from among the number of genuine tablet images that have been stored in the storage device 3, which most closely resembles the cross-check image 20 is not identical with the cross-check image 20 and it is determined that a genuine tablet image identical with the cross-check image 20 has not been stored in the storage device 3 and, hence, that the tablet 4D that is undergoing the authenticity determination, and which was used in imaging, is not a genuine tablet (is a counterfeit tablet) ("NO" at step 72; step 74). For example, a warning to the effect that the tablet 4D is a counterfeit product is displayed on the display screen of the display unit connected to the matching determination apparatus 6.

In the foregoing embodiment, an example (namely full-pattern matching) is described in which correlation values (average correlation value) between the resembling genuine tablet image j and the cross-check image 20 are calculated using the entire resembling genuine tablet image j and the entire cross-check image 20. However, by utilizing feature points (see FIG. 2) regarding the resembling genuine tablet image j, only a partial image that includes the feature points of the resembling genuine tablet image j may be used in calculating the correlation values between the resembling genuine tablet image j and the cross-check image 20 (this is partial-pattern matching). In this case, the correlation values are calculated only between a partial image the center of which is a feature point of the resembling genuine tablet image j and a partial image of the cross-check image 20 at a position corresponding to the first-mentioned partial image. Since a feature point is a location where a feature of the resembling genuine tablet image j appears prominently, a partial image the center of which is the feature point of the resembling genuine tablet image j can be said to be a partial image suitable for use in calculating correlation values between the resembling genuine tablet image j and the cross-check image 20. By calculating correlation values solely between a partial image the center of which is a feature point of the resembling genuine tablet image j and a partial image of the cross-check image 20 at a position corresponding to the first-mentioned partial image, the time needed for calculating the correlation values between the resembling genuine tablet image j and cross-check image 20 can be shortened without sacrificing almost any accuracy in the calculation of correlation values. In such case, instead of image data representing the entire genuine tablet, only data representing a partial image the center of which is a feature point may be stored as the genuine tablet identification data 3A in storage device 3.

As many apparently widely different embodiments of the present invention can be made without departing from the spirit and scope thereof, it is to be understood that the invention is not limited to the specific embodiments thereof except as defined in the appended claims.

What is claimed is:

1. An authenticity determination system comprising a genuine product feature point registration apparatus and a matching determination apparatus, said genuine product feature point registration apparatus including a processor coupled to a memory storing instructions for executing:
   a first correlation value calculation device for calculating a correlation value between a partial image within a genuine product image and a template image;
   a genuine product feature point extraction device for extracting multiple feature points of the genuine product image where the correlation value calculated by said first correlation value calculation device is equal to or greater than a first threshold value; and
   a genuine product identification data storage device for storing genuine product identification data that includes the multiple feature points of the genuine product image extracted by said genuine product feature point extraction device,
   said matching determination apparatus including:
   a second correlation value calculation device for calculating a correlation value between a partial image within an authenticity verification product image and the template image;

an authenticity verification product feature point extraction device for extracting multiple feature points of the authenticity verification product image where the correlation value calculated by said second correlation value calculation device is equal to or greater than a second threshold value; and a similarity calculation device for calculating a degree of similarity between the authenticity verification product image and the genuine product image using a geometric characteristic of the multiple feature points of the authenticity verification product image, which have been extracted by said authenticity verification product feature point extraction device, and a geometric characteristic of the multiple feature points of the genuine product image that have been stored in said genuine product identification data storage device, wherein a luminance of the template image is high at a center thereof and diminishes gradually in a form of concentric circles as a distance from the center increases, or the luminance of the template image is low at the center thereof and rises gradually in the form of the concentric circles as the distance from the center increases.

2. The system according to claim 1, wherein said first correlation value calculation device with which said genuine product feature point registration apparatus is provided scans the genuine product image with the template image and calculates multiple correlation values conforming to positions of the template image in the genuine product image, the processor coupled to the memory instructions for further executing:

a device for creating correlation-value two-dimensional array data by arraying the multiple correlation values in accordance with positions of the template image used in scanning; and a third correlation value calculation device for scanning, with the template image, a correlation-value image represented by correlation-value image data in which the correlation values in the correlation-value two-dimensional array data are used as luminance values, and calculating multiple correlation values conforming to positions of the template image in the correlation-value image, wherein said genuine product feature point extraction device extracts the feature points of the genuine product image, based upon the correlation values calculated by said third correlation value calculation device, instead of extracting the feature points of the genuine product image based upon the correlation values calculated by said first correlation value calculation device.

3. The system according to claim 2, wherein said second correlation value calculation device with which said matching determination apparatus is provided scans the authenticity verification product image with the template image and calculates multiple correlation values conforming to positions of the template image in the authenticity verification product image, and said matching determination apparatus further includes:

a device for creating correlation-value two-dimensional array data by arraying the multiple correlation values in accordance with positions of the template image used in scanning; and a fourth correlation value calculation device for scanning, with the template image, a correlation-value image represented by correlation-value image data in which the correlation values in the correlation-value two-dimensional array data are used as luminance values, and calculating multiple correlation values conforming to positions of the template image in the correlation-value image, wherein said authenticity verification product feature point extraction device extracts the feature points of the authenticity verification product image, based upon the correlation values calculated by said fourth correlation value calculation device, instead of extracting the feature points of the authenticity verification product image based upon the correlation values calculated by said second correlation value calculation device.

4. The system according to claim 2, the processor coupled to the memory storing instructions for further executing:

an iteration control device for repeating, a plurality of times, creation of the correlation-value two-dimensional array data, generation of the correlation-value image data and calculation of correlation values using the correlation-value image and the template image.

5. The system according to claim 1, wherein the genuine product identification data stored in said genuine product identification data storage device of said genuine product feature point registration apparatus includes data representing the genuine product image or data representing multiple partial images of a portion of the genuine product image that include respective ones of the multiple feature points of the genuine product image.

6. The system according to claim 5, wherein said matching determination apparatus further includes a fifth correlation value calculation device for calculating a correlation value between a partial image within the genuine product image and a partial image within the authenticity verification product image, in a case where the degree of similarity calculated by said similarity calculation device is equal to or greater than a third threshold value.

7. The system according to claim 6, wherein said fifth correlation value calculation device with which said matching determination apparatus is provided scans the genuine product image with a correlation value calculation area and, further scans the authenticity verification product image with the correlation value calculation area, and calculates a correlation value between partial images of the genuine product image and authenticity verification product image at corresponding positions thereof within the correlation value calculation area.

8. The system according to claim 6, wherein said fifth correlation value calculation device with which said matching determination apparatus is provided calculates correlation values between multiple partial images that include respective ones of the multiple feature points of the genuine product image included in the genuine product identification data regarding the genuine product image and partial images of the authenticity verification product image at positions corresponding to the multiple partial images.

9. The system according to claim 6, wherein said matching determination apparatus further includes a positional registration device for positionally registering the authenticity verification product image and the genuine product image in accordance with a registration parameter, which is for eliminating relative offset between the genuine product image and authenticity verification product image, calculated based upon the multiple feature points of the authenticity verification product image extracted by said authenticity verification product feature point extraction device and the multiple feature points of the genuine product image that have been stored in said genuine product identification data storage device of said genuine product feature point registration apparatus.

10. A feature point registration apparatus for calculating a degree of similarity between an authenticity verification product image and a genuine product image comprising a processor coupled to a memory storing instructions for executing:
   a first correlation value calculation device for calculating, with regard to each of multiple target images, a correlation value between a partial image within a target image and a template image;
   a feature point extraction device for extracting feature points of the target image where a correlation value calculated by said first correlation value calculation device is equal to or greater than a first threshold value; and
   an identification data storage device for storing target image identification data, which includes the feature points of the target image extracted by said feature point extraction device, with regard to each of the multiple target images,
   wherein a luminance of template image is high at a center thereof and diminishes gradually in a form of concentric circles as a distance from the center increases, or the luminance of the template image is low at the center thereof and rises gradually in the form of the concentric circle as the distance from the center increases.

11. The apparatus according to claim 10, wherein said first correlation value calculation device scans the target image with the template image and calculates multiple correlation values conforming to positions of the template image in the target image, and said feature point registration apparatus further includes:
   a device for creating correlation-value two-dimensional array data by arraying the multiple correlation values in accordance with positions of the template image used in scanning; and
   a second correlation value calculation device for scanning, with the template image, a correlation-value image represented by correlation-value image data in which the correlation values in the correlation-value two-dimensional array data are used as luminance values, and calculating multiple correlation values conforming to positions of the template image in the correlation-value image,
   wherein said feature point extraction device extracts the feature points of the target image, based upon the correlation values calculated by said second correlation value calculation device, instead of extracting the feature points of the target image based upon the correlation values calculated by said first correlation value calculation device.

12. A method of controlling operation a feature point extraction apparatus for calculating a degree of similarity between an authenticity verification product image and a genuine product image, the method comprising:
   calculating, with regard to each of multiple target images, a correlation value between a partial image within a target image and a template image;
   extracting feature points of the target image where the calculated correlation value is equal to or greater than a first threshold value; and
   storing target image identification data that includes the feature points of the target image extracted with regard to each of the multiple target images,
   wherein a luminance of the template image is high at a center thereof and diminishes gradually in a form of concentric circles as a distance from the center increases, or the luminance of the template image is low at the center thereof and rises gradually in the form of the concentric circles as the distance from the center increases.

13. A matching determination apparatus for calculating a degree of similarity between an authenticity verification product image and a genuine product image, comprising including a processor coupled to a memory storing instructions for executing:
   a target image identification data storage device for storing, with regard to each of multiple target images, target image identification data that includes multiple feature points of a target image;
   a correlation value calculation device for calculating a correlation value between a partial image within an authenticity verification product image and a template image;
   a feature point extraction device for extracting multiple feature points of the authenticity verification product image where the correlation value calculated by said correlation value calculation device is equal to or greater than a threshold value; and
   a similarity calculation device for calculating a degree of similarity between the authenticity verification product image and each of the multiple target images using a geometric characteristic of the multiple feature points of the authenticity verification product image, which have been extracted by said feature point extraction device, and a geometric characteristic of the multiple feature points of the target image that have been stored in said target image identification data storage device,
   wherein a luminance of the template image is high at a center thereof and diminishes gradually in a form of concentric circles as a distance from the center increases, or the luminance of the template image is low at the center thereof and rises gradually in the form of the concentric circles as the distance from the center increases.

14. A method of controlling operation of a matching determination apparatus having a target image identification data storage device for storing, with regard to each of multiple target images, target image identification data that includes multiple feature points of the target image, the method comprising:
   calculating a correlation value between a partial image within an authenticity verification product image and a template image;
   extracting multiple feature points of the authenticity verification product image where the calculated correlation value is equal to or greater than a threshold value; and
   calculating a degree of similarity between the authenticity verification product image and each of the multiple target images using a geometric characteristic of the extracted multiple feature points of the authenticity verification product image, and a geometric characteristic of the multiple feature points of the target image that are stored in said target image identification data storage device,
   wherein a luminance of the template image is high at a center thereof and diminishes gradually in a form of concentric circles as a distance from the center increases, or the luminance of the template image is low at the center thereof and rises gradually in the form of the concentric circles as the distance from the ter increases.

15. An authenticity determination system comprising a genuine product feature point registration apparatus and a matching determination apparatus, said genuine product feature point registration apparatus including a processor coupled to a memory storing instructions for executing:
a first correlation value calculation device for scanning a correlation-value image, where multiple correlation values conforming to positions of a template image in a genuine product image by scanning the genuine product image with the template image are used as luminance values, with the template image and calculating the multiple correlation values conforming to positions of the template image in the correlation-value image;
a genuine product feature point extraction device for extracting multiple feature points of the genuine product image where a correlation value calculated by said first correlation value calculation device is equal to or greater than a first threshold value; and
a genuine product identification data storage device for storing genuine product identification data that includes the multiple feature points of the genuine product image extracted by said genuine product feature point extraction device,
said matching determination apparatus including:
a second correlation value calculation device for calculating a correlation value between a partial image within an authenticity verification product image and the template image;
an authenticity verification product feature point extraction device for extracting multiple feature points of the authenticity verification product image where the correlation value calculated by said second correlation value calculation device is equal to or greater than a second threshold value; and
a similarity calculation device for calculating a degree of similarity between the authenticity verification product image and the genuine product image using a geometric characteristic of the multiple feature points of the authenticity verification product image, which have been extracted by said authenticity verification product feature point extraction device, and a geometric characteristic of the multiple feature points of the genuine product image that have been stored in said genuine product identification data storage device.

16. A feature point registration apparatus for calculating a degree of similarity between an authenticity verification product image and a genuine product image comprising a processor coupled to a memory storing instructions for executing:
a first correlation value calculation device for scanning a correlation-value image, where multiple correlation values conforming to positions of a template image in a genuine product image by scanning the genuine product image with the template image are used as luminance values, with the template image and calculating the multiple correlation values conforming to positions of the template image in the correlation-value image;
a feature point extraction device for extracting feature points of the target image where a correlation value calculated by said first correlation value calculation device is equal to or greater than a first threshold value; and
an identification data storage device for storing target image identification data, which includes the feature points of the target image extracted by said feature point extraction device, with regard to each of the multiple target images.

17. A method of controlling operation a feature point extraction apparatus for calculating a degree of similarity between an authenticity verification product image and a genuine product image, the method comprising:
scanning a correlation-value image, where multiple correlation values conforming to positions of a template image in a genuine product image by scanning the genuine product image with the template image are used as luminance values, with the template image and calculating the multiple correlation values conforming to positions of the template image in the correlation-value image;
extracting feature points of the target image where a calculated correlation value is equal to or greater than a first threshold value; and
storing target image identification data that includes the feature points of the target image extracted with regard to each of the multiple target images.

18. A matching determination apparatus, comprising including a processor coupled to a memory storing instructions for executing:
a target image identification data storage device for storing, with regard to each of multiple target images, target image identification data that includes multiple feature points of a target image;
a correlation value calculation device for scanning a correlation-value image, where multiple correlation values conforming to positions of the template image in a genuine product image by scanning the genuine product image with the template image are used as luminance values, with the template image and calculating the multiple correlation values conforming to positions of the template image in the correlation-value image;
a feature point extraction device for extracting multiple feature points of the authenticity verification product image where a correlation value calculated by said correlation value calculation device is equal to or greater than a threshold value; and
a similarity calculation device for calculating a degree of similarity between the authenticity verification product image and each of the multiple target images using a geometric characteristic of the multiple feature points of the authenticity verification product image, which have been extracted by said feature point extraction device, and a geometric characteristic of the multiple feature points of the target image that have been stored in said target image identification data storage device.

19. A method of controlling operation of a matching determination apparatus having a target image identification data storage device for storing, with regard to each of multiple target images, target image identification data that includes multiple feature points of the target image, the method comprising:
scanning a correlation-value image, where multiple correlation values conforming to positions of the template image in a genuine product image by scanning the genuine product image with the template image are used as luminance values, with the template image and calculating the multiple correlation values conforming to positions of the template image in the correlation-value image;
extracting multiple feature points of the authenticity verification product image where a calculated correlation value is equal to or greater than a threshold value; and
calculating a degree of similarity between the authenticity verification product image and each of the multiple target images using a geometric characteristic of the extracted multiple feature points of the authenticity verification product image, and a geometric characteristic of the multiple feature points of the target image that are stored in said target image identification data storage device.

* * * * *